United States Patent [19]

Dennis

[11] Patent Number: 4,784,023

[45] Date of Patent: Nov. 15, 1988

[54] CUTTING ELEMENT HAVING COMPOSITE FORMED OF CEMENTED CARBIDE SUBSTRATE AND DIAMOND LAYER AND METHOD OF MAKING SAME

[75] Inventor: Mahlon D. Dennis, Kingwood, Tex.

[73] Assignee: Diamant Boart-Stratabit (USA) Inc., Houston, Tex.

[21] Appl. No.: 804,864

[22] Filed: Dec. 5, 1985

[51] Int. Cl.$^4$ .............................................. B23P 5/00
[52] U.S. Cl. ............................. 76/108 A; 175/329; 407/119; 408/145
[58] Field of Search .................. 408/144, 145, 713; 407/118, 119; 76/101 A, 108 R, 108 A; 175/329, 330

[56] References Cited

U.S. PATENT DOCUMENTS

| | | | |
|---|---|---|---|
| 1,099,984 | 6/1914 | Kirsten | 408/144 |
| 1,974,215 | 9/1934 | Kilmer | 407/118 |
| 3,767,371 | 10/1973 | Wentorf, Jr. et al. | 264/65 |
| 4,109,737 | 8/1978 | Bovenkerk | 175/327 |
| 4,225,322 | 9/1980 | Knemeyer | 175/329 |
| 4,268,276 | 5/1981 | Bovenkerk | 175/329 |
| 4,478,298 | 10/1984 | Hake et al. | 175/329 |
| 4,592,433 | 6/1986 | Dennis | 175/329 |
| 4,629,373 | 12/1986 | Hall | 407/118 |

FOREIGN PATENT DOCUMENTS 0133386 2/1985 European Pat. Off. .
911004 10/1982 U.S.S.R. .

Primary Examiner—Z. R. Bilinsky
Attorney, Agent, or Firm—Burns, Doane, Swecker & Mathis

[57] ABSTRACT

A cutting element comprises a stud and a composite bonded thereto. The composite comprises a substrate formed of cemented carbide, and a diamond layer bonded to the substrate. The interface between the diamond layer and substrate is defined by alternating ridges of diamond and cemented carbide which are mutually interlocked.

10 Claims, 1 Drawing Sheet

CUTTING ELEMENT HAVING COMPOSITE FORMED OF CEMENTED CARBIDE SUBSTRATE AND DIAMOND LAYER AND METHOD OF MAKING SAME

BACKGROUND AND OBJECTS OF THE INVENTION

The present invention relates to the fabrication of cutting elements, particularly of the type in which a diamond layer is adhered to a carbide substrate to form a composite, and the composite is bonded to a support stud.

One type of cutting element used in rotary drilling operations in earth formations comprises an abrasive composite or compact mounted on a stud. The composite typically comprises a diamond layer adhered to a cemented carbide substrate, e.g., cemented tungsten carbide, containing a metal binder such as cobalt, and the substrate is brazed to the stud. Mounting of the cutting element in a drill bit is achieved by press-fitting or otherwise securing the stud into predrilled holes in the drill bit.

Fabrication of the composite is typically achieved by placing a cemented carbide substrate into the container of a press. A mixture of polycrystalline diamond grains and catalyst binder is placed atop the substrate and is compressed under ultra-high pressure and temperature conditions. In so doing, metal binder migrates from the substrate and "sweeps" through the diamond grains to promote a sintering of the diamond grains. As a result, the diamond grains become bonded to each other to form a diamond layer, and that diamond layer is bonded to the substrate along a planar interface. Metal binder remains disposed in the diamond layer within pores defined between the diamond grains.

A composite formed in that manner may be subject to a number of shortcomings. For example, the coefficients of thermal expansion of cemented carbide and diamond are close but not exactly the same. Thus, during heating or cooling of the composite, thermally induced stresses will occur at the interface between the diamond layer and cemented carbide substrate, the magnitude of the stresses being a function of the disparity in the thermal expansion coefficients.

Another potential shortcoming which should be considered relates to the creation of internal stresses within the diamond layer which can result in a fracturing of that layer. Such stresses can result from the presence of the metal binder within the diamond layer, since the metal binder possesses a much higher coefficient of thermal expansion than the diamond. Thus, the diamond and metal binder will expand or contract at different rates during temperature changes, whereby internal stresses are created in the diamond layer. If the metal binder is uniformly dispersed throughout the diamond layer, the stresses will be, in effect, self-balancing. However, if the metal binder is not uniformly distributed, localized (concentrated) stresses will be established which can lead to a fracturing of the diamond layer. A uniform dispersion of the metal binder would minimize that problem but is difficult to achieve.

The above shortcomings have been recognized in the prior art and efforts have been made to overcome them, as exemplified by the disclosure of European Patent Application No. 0133 386. In that disclosure, it is proposed to provide a polycrystalline diamond body which is completely free of metal binders and a carbide backing. Such a diamond body is to be set directly in a metal support, according to the disclosure in the European Patent Application. However, the mounting of a diamond body directly in metal presents significant problems as regards an inability of the metal to provide sufficient support for the diamond body. The European Patent Application proposes to deal with that problem by providing irregularities, such as spaced ribs in the bottom surface of the diamond body, which ribs are to be embedded in the metal support.

According to the European Patent Application, the irregularities can be formed in the diamond body after the diamond body has been formed, e.g., by laser or electronic discharge treatment, or during the formation of the diamond body in a press, e.g., by the use of a mold having irregularities. As regards the latter, it is suggested in the European Patent Application that a suitable mold could be formed of cemented carbide; in such a case, metal binder would migrate from the mold and into the diamond body, contrary to the stated goals in the European Patent Application of eliminating the carbide substrate and the presence of metal binder in the diamond layer. The European Patent Application proposes to deal with such an inconsistency by immersing the thus-formed diamond/carbide composite in an acid bath which would dissolve the carbide mold and leach all metal binder from the diamond body. There would thus result a diamond body containing no metal binder and which would be mounted directly in a metal support. Notwithstanding any advantages which may result from such a structure, significant disadvantages exist as explained below.

In sum, the European Patent Application proposes to eliminate the problems associated with the presence of a cemented carbide substrate and the presence of metal binder in the diamond layer by completely eliminating the cemented carbide substrate and the metal binder. However, even though the absence of metal binder renders the diamond layer more thermally stable, it also renders the diamond layer less impact resistant. That is, the diamond layer is more likely to be chipped by hard impacts, a characteristic which presents serious problems during the drilling of hard substances such as rock.

Furthermore, the absence of metal binder in the diamond layer eliminates a potential safeguard against fracturing of the diamond layer during so-called "back conversion". That is, it may occur during heating of the diamond layer, e.g., during the brazing of the composite to the stud, or during a cutting operation, that the heated diamond grains tend to convert back into graphite. This imposes stress on the diamond grains which can lead to the formation of cracks in the diamond layer. However, the presence of metal binder within the diamond layer resists the propogation of those cracks, due to the relative ductility of the metal binder as compared to the stiff diamond grains.

It will also be appreciated that the direct mounting of a diamond body in a metal support will not alleviate the afore-discussed problem involving the creation of stresses at the interface between the diamond and metal, which problem results from the very large difference in the coefficients of thermal expansion between diamond and metal. For example, the thermal expansion coefficient of diamond is about $45 \times 10^{-7}$ cm./cm./°C. as compared to a coefficient of $150-200 \times 10^{-7}$ cm./cm./°C. for steel. Thus, very substantial thermally induced stresses will occur at the interface. In addition, once the portions of the diamond which do not carry the ribs begin to wear sufficiently to expose the metal therebehind, that metal will wear rapidly, due to its relative ductility and lower abrasion/erosion resistance, to undermine the integrity of the bond between the diamond and the metal support.

Understandably, then, the elimination of both a cemented carbide substrate and the presence of metal binder from the diamond layer does not represent an ideal solution to the problems confronting the use of diamond cutting elements in drilling operations.

It is, therefore, an object of the present invention to minimize or obviate problems of the above-discussed type.

A further object is to increase the performance of cutting elements of the type employing diamond/cemented carbide composites.

An additional object is to provide a composite comprised of a cemented carbide substrate carrying a diamond layer, the diamond layer containing metal binder which is highly uniformly dispersed at least in the area of the interface between the diamond layer and the substrate.

A further object is to minimize the magnitude of thermally induced stresses occurring at the interface between the diamond and cemented carbide substrate.

SUMMARY OF THE INVENTION

These and other objects are achieved by the present invention which relates to a cutting element comprising a stud including a generally cylindrical shank with a outer surface, and a composite bonded to such outer surface. The composite comprises a substrate and a diamond layer thereon. The substrate is formed of cemented carbide and includes a first surface bonded to the outer surface of the stud, and an opposing second surface having alternating ridges and grooves. The depth of the grooves is less than the thickness of the substrate. The diamond layer includes an outer cutting surface and an opposing mounting surface adhering to the second surface. The mounting surface includes alternating ridges and grooves interlocked with the grooves and ridges of the substrate. The depth of the grooves in the mounting surface is less than the thickness of the diamond layer.

The present invention also involves a method aspect which comprises the steps of forming a substrate of cemented carbide including first and second surfaces disposed opposite one another, and forming alternating ridges and grooves in the second surface, the depth of the grooves being less than the thickness of the substrate. The second surface is covered with a layer of diamond grains such that the grains fill the grooves and form a solid layer thereabove. Heat and pressure are applied to the substrate and diamond grains to cause the diamond grains to adhere to each other and to the second surface. The first surface of the substrate is bonded to an outer surface of a generally cylindrical mounting stud.

BRIEF DESCRIPTION OF THE DRAWINGS

The objects and advantages of the invention will become apparent from the following detailed description of a preferred embodiment thereof in connection with the accompanying drawings, in which like numerals designate like elements, and in which.

DETAILED DESCRIPTION OF A PREFERRED EMBODIMENT OF THE INVENTION

Figure 1:
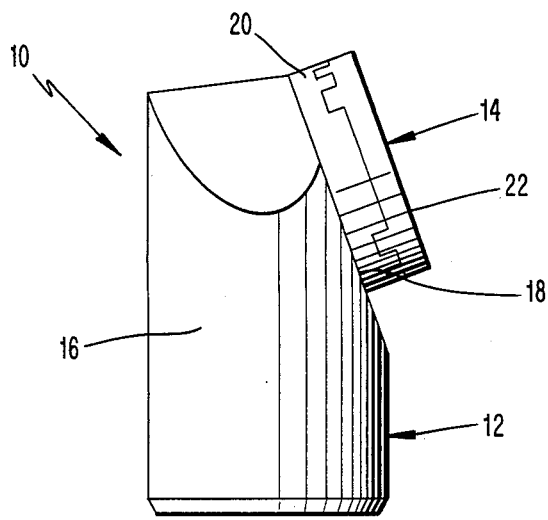
FIG. 1 is a side elevational view of a cutting element in accordance with the present invention.
Figure 2:
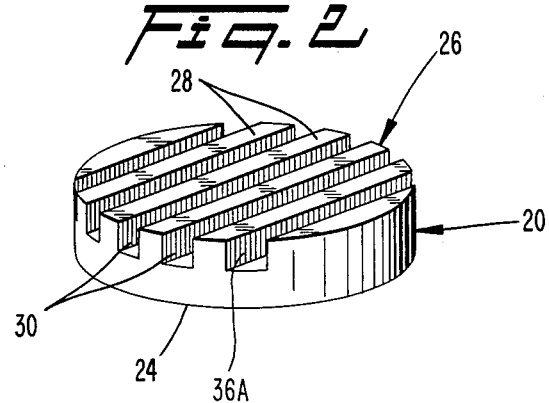
FIG. 2 is a perspective view of a cemented carbide substrate according to the present invention.
Figure 3:
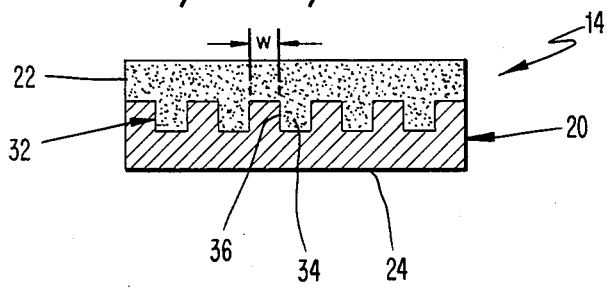
FIG. 3 is a longitudinal sectional view taken through a composite comprising the cemented carbide substrate of FIG. 2 and a layer of diamond bonded to the substrate.
Figure 4:
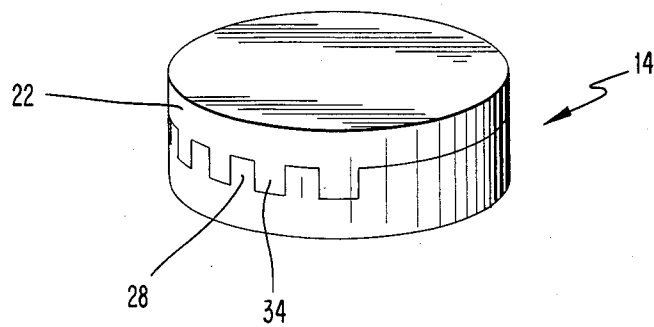
FIG. 4 is a perspective view of the composite depicted in FIG. 3.

A cutting element 10 according to the present invention comprises a stud 12 and a disc-shaped composite or compact 14 bonded thereto.

The stud, which is preferably comprised of cemented carbide but which could also be formed of steel, includes a generally circular cylindrical shank 16 having an outer face 18 to which the composite is bonded, e.g., by brazing.

The composite 14 comprises a substrate 20 formed of a cemented carbide, and a diamond layer 22 adhered thereto. The diamond layer may comprise polycrystalline diamond, for example.

The cemented carbide substrate 20 is of circular cylindrical shape and comprises a first surface 24 which is substantially planar and adapted to be braze-bonded to the outer surface 18 of the stud. Opposite the first surface is a second surface 26 composed of alternating ridges 28 and grooves 30 which alternate in a generally radial direction, although the ridges 28 themselves are not necessarily radially oriented.

The diamond layer 22 includes a mounting surface 32 adhered to the second surface 26 of the cemented carbide substrate 20. That mounting surface 32 is composed of alternating ridges 34 and grooves 36 which are interlocked with the grooves and ridges 30, 28, respectively, of the cemented carbide substrate 20. That is, the ridges 34 of the diamond layer are received in the grooves 30 of the cemented carbide substrate, and the ridges 28 of the cemented carbide substrate are received in the grooves 36 of the diamond layer.

Preferably, the ridges and grooves extend completely across the composite, i.e., both ends of each ridge 28, 34 and groove 30, 36 intersect the outer peripheral edge of the composite.

The composite is typically manufactured by initially fabricating (e.g., by sintering) a cemented carbide substrate 20 having smooth top and bottom surfaces. The substrate may also be preformed and sintered. Then, the grooves and ridges 28, 30 are formed in the surface 26 by a suitable cutting or etching process. The ridges can have parallel side walls 36A as shown, whereby the width W of each ridge 28 is uniform throughout its depth. Alternatively, the side walls can be mutually inclined to form ridges having a dove-tail cross-sectional shape. The recessed substrate 20 is then placed in a conventional press and grains of polycrystalline diamond are applied to the surface 26 of the substrate 20, sufficiently to fill the grooves plus create a further layer of grains above the ridges 28. The diamond grains and cemented carbide substrate are then subjected to ultra-high pressure and temperature conditions, whereupon the grains of diamond are bonded to each other and to the cemented carbide substrate. The principles of that pressing step are explained, for example in Wentorf, Jr. U.S. Pat. No. 3,767,371. Thereafter, the composite is braze-bonded to the stud 12 and the outer edge of the diamond layer can be beveled, if desired.

During the application of heat and pressure in the press, the binder metal, e.g., cobalt, weeps out of the cemented carbide and passes through the diamond by liquid diffusion. In so doing, the cobalt sinters the diamond grains and occupies pores disposed between the diamond grains. It has been found that the presence of the ridges and grooves enables the metal binder to become more uniformly dispersed throughout the ridges 34 of the diamond layer. In that regard, it will be appreciated that the presence of ridges and grooves increases the total surface area (interface) between the diamond and cemented carbide, thereby increasing the surface area from which cobalt may flow. Furthermore, the distance by which the cobalt must travel is reduced since the cemented carbide ridges project well into the diamond layer. Also, the cobalt is able to flow through the diamond ridges in three directions rather than in merely a single direction. Consequently, the metal binder is more uniformly dispersed throughout the diamond layer. For reasons discussed earlier herein, such uniform dispersion resists the creation of stress concentrations in the diamond layer when the composite is heated or cooled, because the stresses, being randomly directed, tend to resist one another and are thus self-balancing.

It will also be appreciated that a composite formed in accordance with the present invention minimizes the thermal stresses occurring between the diamond and cemented carbide. In that regard, it will be appreciated that in the case of a prior art composite containing a planar interface between the diamond layer and substrate, the difference in the thermal expansion coefficients between those two components creates stresses at the interface. However, the composite according to the present invention may be considered as comprising three zones, i.e., a zone of diamond, a zone of cemented carbide, and an intermediate zone composed of the diamond and carbide ridges. That intermediate diamond/carbide zone thus has a coefficient of thermal expansion whose value is about halfway between the coefficients of the diamond and cemented carbide zones. As a result, the intermediate zone functions as a buffer or graded stress interface to minimize the stresses occurring between the diamond and cemented carbide zones.

Furthermore, it is believed by the present inventor that the amount of thermally induced stress occurring between the diamond and cemented carbide components is a function of the size of the continuous, unbroken area of the interface between those components. In the present invention, the interface has been broken by the grooves into a series of smaller areas, and the stresses occurring in those areas are, it is believed, not cumulative, whereby the overall stress is much less than would be the case in the absence of the ridges and grooves, i.e., in the case of a planar interface.

It will thus be appreciated that the present invention significantly alleviates many of the disadvantages commonly occurring heretofore in composites of the type comprising layers of diamond and cemented carbide. That is, metal binder is very uniformly dispersed throughout the ridges of the diamond layer, whereby the occurrence of concentrated stresses is resisted. Also, the presence of the metal binder in the diamond layer maximizes the impact resistance of the diamond layer and provides for the attenuation of cracks resulting from back-conversion of the diamond grains.

The presence of the intermediate zone comprised of alternating ridges of diamond and cemented carbide serves to minimize the magnitude of thermally induced stresses between the diamond layer and the cemented carbide layer by acting as a graded stress interface. That is, the value of the coefficient of thermal expansion of that intermediate zone is about midway between that of diamond and cemented carbide. Actually, the thermal coefficients of diamond and cemented carbide are relatively close (i.e., about 45 cm./cm./°C.$\times 10^{-7}$ for diamond and about 60–65 cm./cm./°C.$\times 10^{-7}$ for cemented carbide). Thus, the coefficient of the intermediate layer is about 52–55 cm./cm./°C.$\times 10^{-7}$ which reduces the thermally induced stresses to tolerable levels.

During use of a cutting element according to the present invention, the portions of the diamond layer which do not carry the ridges will wear away sooner than the portions which carry the ridges (since the latter portions are thicker). Such an occurrence will serve to expose the ridges of the substrate which will wear at a faster rate than the adjacent diamond ridges (due to differences in abrasion resistance). Wearing-away of the substrate ridges will produce recesses between the diamond ridges which will function to conduct cooling fluid to more efficiently cool the diamond, as well as to conduct-away cuttings so that the cutter element does not recut same. The required longitudinal pressure of the cutting element against the earth formation can be reduced due to the presence of the diamond ridges, because the cutting engagement between the diamond and the formation will be in the form of line contact between the diamond ridges and the formation in contrast to surface contact; thus, the longitudinal forces will be concentrated at the diamond ridges.

Although the present invention has been described in connection with a preferred embodiment thereof, it will be appreciated by those skilled in the art that modifications, substitutions, additions, and deletions may be made without departing from the spirit and scope of the invention as defined in the appended claims.

What is claimed is:
1. A cutting element comprising:
   a stud including a generally cylindrical shank with an outer surface,
   a composite bonded to said outer surface and comprising
      a substrate formed of cemented carbide and including a first surface bonded to said outer surface and an opposing second surface having alternating ridges and grooves, each of said grooves formed by spaced apart planar side walls which are substantially parallel to each other, said side walls of each groove being spaced apart from, and substantially parallel to, the side walls of adjacent grooves whereby said ridges are of substantially uniform width throughout their depth, and
      a sintered diamond layer including an outer cutting surface and an opposing mounting surface adhering to said second surface, said mounting surface including alternating ridges and grooves interlocked within said grooves and ridges in said substrate.
2. A cutting element according to claim 1, wherein said stud is formed of cemented carbide.

3. A cutting element according to claim 1, wherein said ridges and grooves each extend completely across said second surface.

4. A cutting element according to claim 1, wherein said substrate is formed of cemented tungsten carbide.

5. A cutting element according to claim 1, wherein said composite is of circular cylindrical shape.

6. A cutting element according to claim 1, wherein said diamond layer has metal binder particles disposed in pores between said sintered diamond grains.

7. A method of making a cutting element comprising the steps of:
forming a substrate of cemented carbide including first and second surfaces disposed opposite one another,
forming alternating ridges and groves in said second surface, each of said grooves formed by spaced apart planar side walls which are substantially parallel to each other, said side walls of each groove being spaced apart from, and substantially parallel to, the side walls of adjacent grooves whereby said ridges are of substantially uniform width throughout their depth,
covering said second surface with a layer of diamond grains such that said grains fill said grooves and form a solid layer above said grooves,
applying heat and pressure to said substrate and diamond grains to cause said diamond grains to adhere to each other and to said second surface, and
bonding said first surface of said substrate to an outer surface of a generally cylindrical mounting stud.

8. A method according to claim 7, wherein said grooves are formed so as to extend completely across said second surface.

9. A method according to claim 7, wherein said substrate forming step comprises forming said substrate of cemented tungsten carbide.

10. A method according to claim 7, wherein said applying step comprises applying heat and pressure to cause metal binder to flow out of said substrate and into said layer of diamond grains.

* * * * *